United States Patent [19]
Zausner

[11] Patent Number: 5,862,216
[45] Date of Patent: Jan. 19, 1999

[54] TELEPHONE LOCK GUARD

[75] Inventor: Fredrick Zausner, Port Washington, N.Y.

[73] Assignee: Resco Metal & Plastics Products Corp., Brooklyn, N.Y.

[21] Appl. No.: 819,756

[22] Filed: Apr. 3, 1997

[51] Int. Cl.[6] .................................................. H04M 1/00
[52] U.S. Cl. ........................ 379/453; 379/451; 379/437
[58] Field of Search ................................... 379/437, 451, 379/453, 445; 194/350; 90/164, 159

[56] References Cited

U.S. PATENT DOCUMENTS

| | | | |
|---|---|---|---|
| 2,716,882 | 9/1955 | Gill et al. | 70/159 |
| 3,213,210 | 10/1965 | Samples | 379/445 |
| 3,297,123 | 1/1967 | Hutchins | 194/350 |
| 3,391,256 | 7/1968 | Nawman | 379/451 |
| 3,833,104 | 9/1974 | Blum | 194/350 |
| 3,910,393 | 10/1975 | de Crepy | 194/350 |
| 4,267,411 | 5/1981 | Raines | 379/451 |
| 4,406,358 | 9/1983 | Zahradnik | 70/164 |
| 4,942,748 | 7/1990 | McGough | 379/451 |
| 5,381,469 | 1/1995 | Zausner | 379/437 |

*Primary Examiner*—Jack Chiang
*Attorney, Agent, or Firm*—Schweitzer Cornman Gross & Bondell LLP

[57] ABSTRACT

A lock guard for use in connection with a lock assembly having a bolt action mechanism comprises a rigid plate bounded by upper and lower walls, the plate fitting against a side of the bolt mechanism, the side walls embracing and surround the top and bottom edges of the mechanism. A front panel embraces and covers a bolt plate to be engaged by the bolt. The guard prevents access to the lock mechanism and bolt plate. The lock assembly is of particular utility in connection with key lock units used in coin-operated pay telephones.

9 Claims, 3 Drawing Sheets

TELEPHONE LOCK GUARD

The present invention relates to a new and improved guard device for use in connection with lock assemblies, and particularly lock assemblies utilized in pay telephones.

BACKGROUND OF THE INVENTION

Publicly accessible pay telephones have long been an attractive target for vandalism and robbery. Over the years substantial efforts have been made to reinforce the telephone box structure and to place impediments in the way of those persons seeking unauthorized access to the telephone and particularly to the telephone's coin box. Such measures have included the incorporation of strengthening panels or overlying housing elements to prevent or at least deter access to the interior of the telephone housing from which the coin box contents can be reached.

One particularly tempting area for attack is the area of the housing upon which the telephone dial is mounted. To accommodate the use of touchtone dialing mechanisms, the telephone housing must be provided with a plurality of apertures for the touchtone dial assembly's buttons or keys. This matrix through the housing, as well as the pushbutton assembly itself, often yields to the attack of the vandal. Once entry into the interior of the telephone is made, the vandal can relatively easily defeat or remove the lock assembly which secures the telephone housing to a back panel, allowing the telephone box to be removed, resulting in ultimate access to the coin box.

It is accordingly a purpose of the present invention to provide an apparatus which improves the resistance to lock assemblies to removal or tampering.

It is another purpose of the present invention to provide an apparatus which further maintains the security and integrity of a coin-operated telephone, and in particular the lock mechanism associated therewith.

Still another purpose of the present invention is to provide a guard assembly for a lock mechanism, such as are utilized in coin-operated telephones and similar devices, which restricts access to the lock mechanism while permitting normal operation thereof.

Yet another purpose of the present invention is to provide a guard mechanism of the aforementioned type which further shields the bolt of a lock mechanism, thereby providing additional protection thereto.

BRIEF DESCRIPTION OF THE INVENTION

In accordance with the foregoing and other objects and purposes, a lock guard apparatus constructed in accordance with the present invention is formed of a heavy gauge metal and has a first panel adapted to be mounted flush against an exposed side of a lock mechanism. Upper and lower edge walls extend from the panel, and overlie and protect corresponding top and bottom surfaces of the lock. The guard apparatus further includes a front wall, which overlies and covers the aperture through which the lock bolt passes when the bolt is in the extended, locking position. The guard apparatus is mounted to and about the lock preferably by the same mounting means, typically bolts, which mount the lock. The guard apparatus further includes means to surround the heads of the mounting bolts, further insulating them from tampering.

BRIEF DESCRIPTION OF THE DRAWINGS

A fuller understanding of the present invention and the operation and benefits associated therewith will be obtained upon review of the following detailed description of a preferred, but nonetheless illustrative embodiment of the invention, when reviewed in connection with the annexed drawings, wherein.

DETAILED DESCRIPTION OF THE INVENTION

Figure 1:
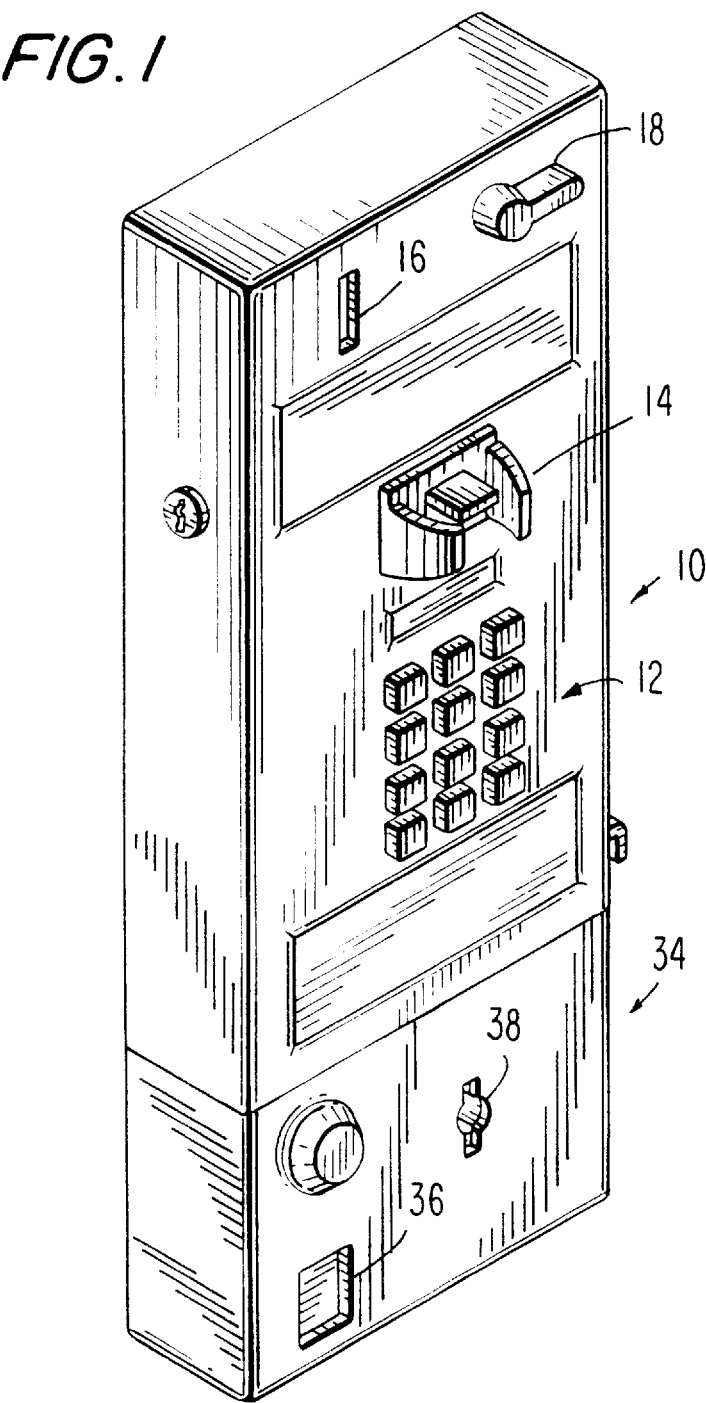
FIG. 1 is a perspective view of a typical coin telephone housing.
Figure 2:
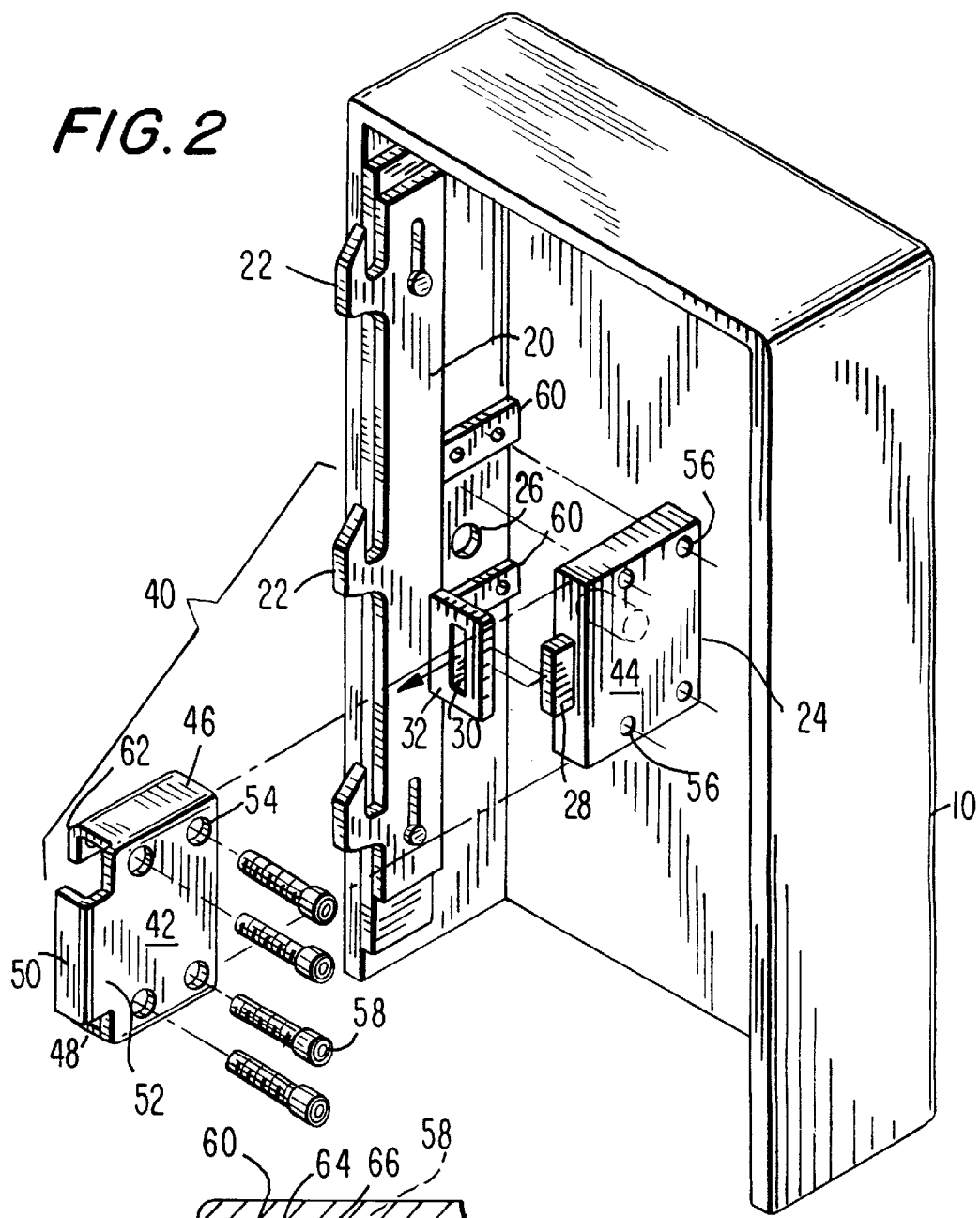
FIG. 2 is a perspective simplified exploded view of the invention shown in association with the coin telephone housing and lock mechanism of FIG. 1.

As detailed in the drawings, a typical coin telephone apparatus includes an upper housing 10 in which the electrical and mechanical components of the telephone (not shown) are located. As depicted in FIG. 1, the upper housing encloses and supports the pushbutton dial matrix 12, a handset cradle 14, and is provided with a coin slot 16 and clearing lever 18. As seen in FIG. 2, a lock system is provided to allow the upper housing to be removed from a rear mounting plate (not shown) to allow authorized access to the telephone unit's components. The lock system includes a pair of opposed ganged lock bars 20 (only one of which is shown) The lock bars are located on the interior side walls of the upper housing, and are vertically movable between a lower position and an upper position, shown in FIG. 2, in which the lock bar hooks 22 engage mating elements on the telephone unit rear plate to rigidly join the elements together. A lock 24, which is key-actuated through a bore 26 in the upper housing side wall, is mounted to the side wall and has extendable bolt 28 which selectively engages the bore 30 in plate 32 mounted to the adjacent lock bar when the lock bars are in the upper position. Retracting the bolt allows the lock bars to descend, unlatching the upper housing from the rear plate.

As further depicted in FIG. 1, the coin telephone includes a lower housing 34, the top edge of which firmly abuts against the lower edge of the upper housing. The lower housing is typically separately mounted to the rear plate, encloses a coin collection box, and provides a coin return slot 36. A lock mechanism having key slot 38 is provided to allow authorized coin collection personnel access to the enclosed coin box without providing entry to the components located in the upper housing 10.

While the lower housing 34, as well as the majority of the upper housing 10, are of substantial construction, the central portion of the front face of upper housing 10, because of its need to support the pushbutton dial matrix 12, is somewhat weaker and hence vulnerable to attack. It has been found, for example, that the front panel about the pushbutton matrix can be cut or otherwise destroyed, allowing a thief access to the interior of the housing and thus to lock 24. The lock can then be unbolted from the housing, freeing the lock bar and allowing the phone housing to be removed. Alternatively, the dial matrix are can provide some measure of access to the lock bolt 28 and bolt plate 32 whereby the locking action is defeated without actual removal of the lock.

To combat such attacks, the present invention 40 serves as a shield or guard for the lock 24. In particular, the guard 40, which is formed of a heavy gauge steel or other tough material, includes a main plate or panel 42 dimensioned to substantially overlie and cover the exposed side face 44 of lock 24. The guard's upper and lower edge walls 46, 48 extend outwardly from the top and bottom edges of the main panel, form a generally U-shaped assembly with the main plate, and similarly overlie and protect the corresponding top and bottom faces of the lock. A front vertical panel 50, mounted to tab portion 52 of main panel 42 in an L-shaped configuration, is oriented to lie in front of the plate 32 and its bolt-receiving bore 30. The tab portion 52 further covers the exposed side of the bolt as well as the edge of plate 32.

Figure 3:
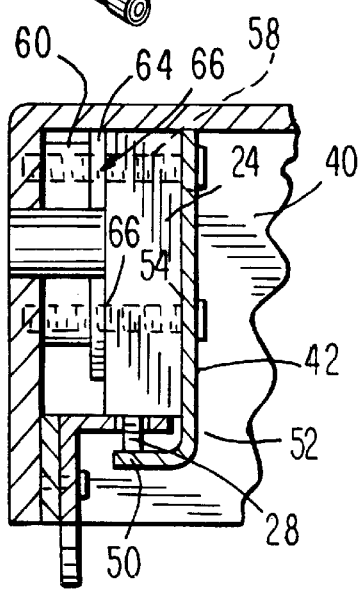
FIG. 3 is a top plan view in section of the invention in place.
Figure 4:
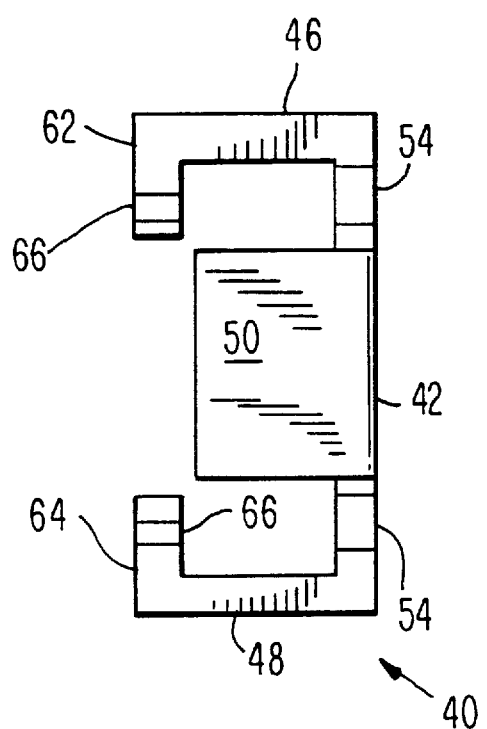
FIG. 4 is a front elevation view of the invention.

Referring further to FIGS. 2, 3 and 4, the main plate 42 of the guard 40 is provided with a series of bores 54 which align with the mounting bores 56 in lock 24. The lock mounting bores 56 accept the shanks of mounting bolts 58 which mount the lock to the mounting studs 60 on the side wall of the upper housing. The diameter of the bores 54 in the main plate are chosen to allow the heads of the mounting bolts 58 to be substantially surrounded thereby when fully installed as detailed in FIG. 3, whereby the bolt heads are recessed in the bores and substantially surrounded by the main plate 42, thus preventing gripping tools which may be inserted through a mutilated dial matrix area from obtaining a purchase on the bolt heads for purposes of removal. The recessed heads also deny access to the bolt head-neck interface, thus preventing attempts to slice or shear the bolt head off.

As best seen in FIG. 4, the distal ends of the guard's upper and lower edge wall portions 46, 48 are provided with inwardly-directed flanges 62, 64, respectively, each flange having pairs of bores 66 also aligned with the lock's mounting bores 56. The flange bores allow passage of the shanks of the bolts 58, the flanges serving to rigidly mount the guard apparatus to and about the lock 24 and to the housing 10 and studs 60.

As may be best seen in FIG. 3, the width of the tab portion 52 of main panel 42 which supports front panel 50 is chosen such that front panel 50 is positioned in front of bolt plate 32, overlying the bolt receiving bore 30, spaced forwardly therefrom sufficiently to provide clearance for bolt 28 when in the extended position. The combination of the tab portion 52 and front panel 50 prevent access to the bolt 28 as well as denying direct access to the plate 32 and the bolt receiving bore therein, thus denying the opportunity to the thief to either attempt to shear off the bolt or bend or otherwise attempt to manipulate the bolt plate 32 away from the bolt 28.

I claim:

1. In an apparatus having an internally-mounted lock assembly comprising a bolt which extends from a lock body through a receiving bore in a bolt plate from a first side to a second side thereof to prevent relative movement between said lock assembly and said bolt plate, the improvement comprising a guard formed of rigid plate material having a main panel, upper and lower edge walls, and a front panel, said main panel being dimensioned and adapted to overlie a first side of said lock body, said upper and lower walls being adapted and dimensioned to overlie top and bottom walls of said lock assembly, said front panel being adapted and dimensioned to overlie said second side of said bolt plate.

2. The improvement of claim 1 further comprising a first flange mounted to a distal edge of said upper wall and a second flange mounted to a distal edge of said lower wall, said flanges overlying portions of a second side of said lock body.

3. The improvement of claim 2, wherein said lock body is mounted by at least one mounting bolt passing through said lock body, said flanges having bores to pass said mounting bolts, said main panel having means for protecting the heads of said mounting bolts.

4. The improvement of claim 3, wherein said protection means comprise a bore in said main panel dimensioned to accept and surround the mounting bolt head.

5. A guard assembly for a lock assembly, said lock assembly having a lock with a first and second side, top and bottom faces, and a front face in confronting relationship with a first face of a bolt plate lock, a bolt being operable between a retracted position and an extended position through an aperture in said bolt plate from a first face to a rear face thereof, said guard assembly comprising a main panel having opposed top and bottom edges and a front side edge, upper and lower edge walls extending outwardly from said top and bottom edges, respectively, in a generally U-shaped orientation, and L-shaped panels mounted to said front side edge, main panels and walls being dimensioned and constructed to embrace, overlie and abut the first side and top and bottom faces of the lock, a portion of said L-shaped panel overlying the rear face of the bolt plate.

6. The guard assembly of claim 5, wherein said upper and lower edge walls each further have a flange positioned adjacent a portion of the second side of the lock.

7. The guard assembly of claim 6, wherein said guard assembly includes mounting means to rigidly affix said guard to said lock.

8. The guard assembly of claim 7, wherein said mounting means comprise at least one pair of first and second aligned bases through said main panel and one of said flanges, respectively, to pass a lock mounting bolt.

9. The guard assembly of claim 8, wherein said first bore is dimensioned to surround a head of the lock mounting bolt passing therethrough.

* * * * *